US012358515B2

(12) United States Patent
Gordon et al.

(10) Patent No.: US 12,358,515 B2
(45) Date of Patent: Jul. 15, 2025

(54) METHOD FOR ASSESSING LATERAL ACCELERATION USING TELEMETRY DATA

(71) Applicant: GM Global Technology Operations LLC, Detroit, MI (US)

(72) Inventors: Richard Gordon, Canton, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 327 days.

(21) Appl. No.: 18/177,322

(22) Filed: Mar. 2, 2023

(65) Prior Publication Data
US 2024/0294174 A1    Sep. 5, 2024

(51) Int. Cl.
*B60W 40/109* (2012.01)
*B60W 30/18* (2012.01)
*B60W 40/072* (2012.01)
*B60W 40/105* (2012.01)

(52) U.S. Cl.
CPC .... *B60W 40/109* (2013.01); *B60W 30/18145* (2013.01); *B60W 40/072* (2013.01); *B60W 40/105* (2013.01); *B60W 2552/30* (2020.02)

(58) Field of Classification Search
CPC .. B60W 40/10; B60W 40/105; B60W 40/109; B60W 40/072; B60W 2552/30; B60W 30/18145; B60W 2556/50; B60W 2556/55
See application file for complete search history.

(56) References Cited

U.S. PATENT DOCUMENTS

| | | | | | |
|---|---|---|---|---|---|
| 6,138,084 | A | * | 10/2000 | Mine | G01C 21/26 |
| | | | | | 702/158 |
| 6,304,818 | B1 | * | 10/2001 | Kamiya | G01C 21/30 |
| | | | | | 701/520 |
| 2014/0044311 | A1 | * | 2/2014 | Takahashi | G08G 1/167 |
| | | | | | 382/103 |
| 2014/0142780 | A1 | * | 5/2014 | Chen | B60W 40/072 |
| | | | | | 701/1 |
| 2014/0358436 | A1 | * | 12/2014 | Kim | G01C 21/3822 |
| | | | | | 701/532 |
| 2017/0066450 | A1 | * | 3/2017 | Ko | G05D 1/0214 |

OTHER PUBLICATIONS

Syed, Experimental Investigation of Vehicle's Lateral Acceleration on Highway Horizontal Curves, 2005, Carleton University (Year: 2005).*

* cited by examiner

*Primary Examiner* — Ramya P Burgess
*Assistant Examiner* — Sara J Lewandroski
(74) *Attorney, Agent, or Firm* — Vivacqua Crane, PLLC

(57) ABSTRACT

A method for assessing lateral acceleration includes receiving vehicle telemetry data. The vehicle telemetry data includes a plurality of geographical positions along the curved trajectory traveled by the vehicle, the heading of the vehicle at each of the plurality of geographical, and the velocity of the vehicle at each of the plurality of geographical positions. The method further includes determining a curve radius of the curve trajectory traveled by the vehicle using the vehicle telemetry data and determining a lateral acceleration of the vehicle at each of the plurality of geographical positions along the curve trajectory The method further includes converting the lateral acceleration of the vehicle at each of the plurality of geographical positions along the curve trajectory traveled by the vehicle into a g-force.

12 Claims, 2 Drawing Sheets

METHOD FOR ASSESSING LATERAL
ACCELERATION USING TELEMETRY DATA

The present disclosure relates to methods and systems for assessing lateral acceleration using telemetry data.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicles may sometimes drive along a curved trajectory. When driving along a curved trajectory, the vehicle accelerates laterally, which causes g-forces.

SUMMARY

The present disclosure relates to methods for assessing lateral acceleration using telemetry data. In aspect of the present disclosure, the method includes receiving vehicle telemetry data. The vehicle telemetry data is collected by sensors of a vehicle traveling along a curve trajectory. The vehicle telemetry data includes a plurality of geographical positions along the curved trajectory traveled by the vehicle. The vehicle telemetry data includes a heading of the vehicle at each of the plurality of geographical positions along the curved trajectory traveled by the vehicle. The vehicle telemetry data includes the velocity of the vehicle at each of the plurality of geographical positions. The method further includes determining a curve radius of the curve trajectory traveled by the vehicle using the vehicle telemetry data. The method includes determining a lateral acceleration of the vehicle at each of the plurality of geographical positions along the curve trajectory traveled by the vehicle using the curve radius. The method further includes converting the lateral acceleration of the vehicle at each of the plurality of geographical positions along the curve trajectory traveled by the vehicle into a g-force. The method described in paragraph improves vehicle technology by curating telemetry data and using position vectors and headings to detect vehicle turns and estimate an unknown curve radius generating the observed geographical positions (e.g., GPS coordinates) and headings. The method described in paragraph also improves vehicle technology by determining lateral acceleration without relying on sensors that measure lateral acceleration. This method is delay tolerant and is an algorithm executed in a cloud-based system via consumption of connected vehicle telemetry data reports.

In aspect of the present disclosure, the vehicle telemetry data does not include the lateral acceleration of the vehicle. The method further includes transmitting a notification related to the g-force.

In aspect of the present disclosure, the method further includes comparing the g-force with a predetermined threshold to determine whether the g-force is greater than the predetermined threshold, and in response to determining that the g-force is greater than the predetermined threshold, transmitting the notification related to the g-force. Transmitting notification related to the g-force includes commanding a user interface of the vehicle to display a message indicating a hard cornering event.

In aspect of the present disclosure, the plurality of geographical positions includes a first GPS location of the vehicle at a first time and a second GPS location of the vehicle at a second time. The second time is three seconds later than the first time. The vehicle telemetry data includes a first heading at the first GPS location and a second heading of the vehicle at the second GPS location. The first heading is defined by a first heading vector. The second heading is defined by a second heading vector.

In aspect of the present disclosure, the method further includes creating a first radius line that intersects the first GPS location and is perpendicular to the first heading vector, creating a second radius line that intersects the second GPS location and is perpendicular to the second heading vector, and determining an intersection point where the first radius line intersects the second radius line.

In aspect of the present disclosure, the method further includes determining a first distance from the intersection point to the first GPS location, determining a second distance from the intersection point to the second GPS location, and defining the curve radius as to a minimum between the first distance and the second distance.

In aspect of the present disclosure, the method includes determining the lateral acceleration using the following equation:

$$Lat\,Accel = \frac{v^2}{\text{radius} \times g}$$

where:
Lat Accel is the lateral acceleration of the vehicle;
v Is the vehicle velocity;
radius is the curve radius; and
g is the gravitational constant.

The present disclosure also describes a tangible, non-transitory, machine-readable medium, comprising machine-readable instructions, that when executed by a processor, cause the processor to execute the method described above.

The present disclosure also describes a system including sensors and a controller in communication with the sensors. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
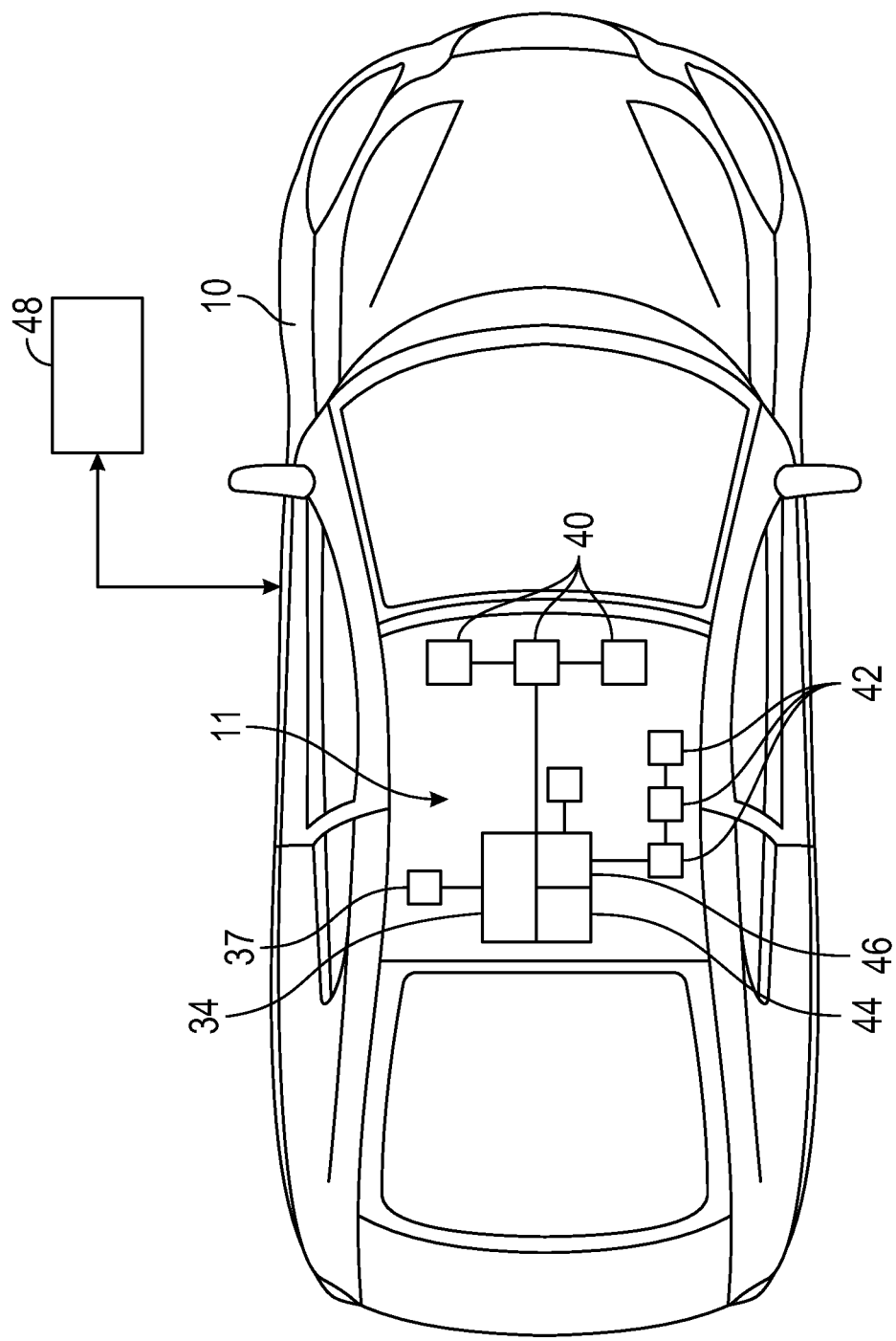
FIG. 1 is a schematic top view of a vehicle including a system for assessing lateral acceleration using telemetry data.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 includes (or is in communication with) a system 11 for assessing lateral acceleration using telemetry data. While the system 11 is shown inside the vehicle 10, it is contemplated that the system 11 may be outside of the vehicle 10. As a non-limiting example, the system 11 may be in wireless communication with the vehicle 10. Although the vehicle 10 is shown as a sedan, it is envisioned that that vehicle 10 may be another type of vehicle, such as a pickup truck, a coupe, a sport utility vehicle (SUVs), a recreational vehicle (RVs), etc.

The vehicle 10 includes a controller 34 and one or more sensors 40 in communication with the controller 34. The sensors 40 collect information and generate sensor data indicative of the collected information. As non-limiting examples, the sensors 40 may include Global Navigation Satellite System (GNSS) transceivers or receivers (e.g., Global Positioning System (GPS) transceivers and/or receivers), yaw rate sensors, speed sensors, lidars, radars, ultrasonic sensors, and cameras, among others. The GNSS transceivers or receivers are configured to detect the location of the vehicle 10 in the globe. The speed sensors are configured to detect the speed of the vehicle 10. The yaw rate sensors are configured to determine the heading of the vehicle 10. The cameras may have a field of view large enough to capture images in front, in the rear, and in the sides of the vehicle 10. The ultrasonic sensor may detect static and/or dynamic objects. At least one of the sensors 40 is configured to determine the current location of the vehicle 10. As non-limiting examples, this sensor 40 may be a vehicle location sensor, such as a GPS tracker.

The system 11 further includes the controller 34, which is in communication with the sensors 40. Accordingly, the controller 34 is programmed to receive sensor data from the sensors 40. The controller 34 includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

Figure 2:
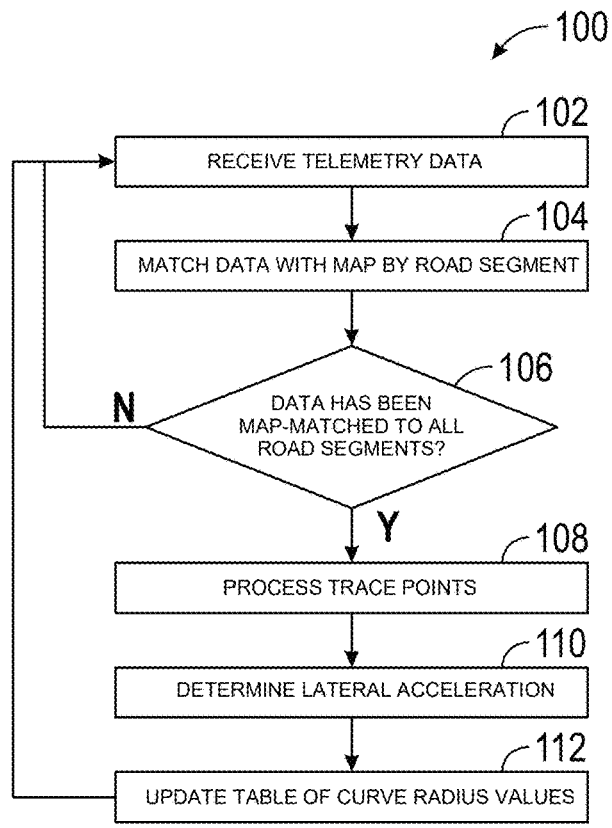
FIG. 2 is a flowchart of a method for assessing lateral acceleration using telemetry data.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators 42 to automatically control the components of the vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 2), that when executed by the one or more processors, cause the processors 44 to execute the method 100 (FIG. 2). Therefore, the controller 34 may be specifically programmed to execute the method 100.

The vehicle 10 includes a user interface 23 in communication with the controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification to the vehicle user of the vehicle 10. The user interface 23 is in electronic communication with the controller 34 and is configured to receive inputs from a vehicle user (e.g., a vehicle user or a vehicle passenger). For example, the user interface 2 may include a touch screen and/or buttons configured to receive inputs from a vehicle user. Accordingly, the controller 34 is configured to receive inputs from the vehicle user via the user interface 23 and to provide an output (i.e., an alert) to the vehicle user.

The vehicle 10 may include one or more communication transceivers 37 in communication with the controller 34. Each of the communication transceivers 37 is configured to wirelessly communicate information to and from other remote entities, such as the remote vehicles, (through "V2V" communication), infrastructure (through "V2I" communication), remote systems 48 at a remote call center (e.g., ON-STAR by GENERAL MOTORS), and/or personal electronic devices, such as a smart phone. The communication transceivers 37 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication transceivers 37 may include one or more antennas for receiving and/or transmitting signals, such as cooperative sensing messages (CSMs). The communication transceivers 37 may be considered sensors 40 and/or sources of data. The remote vehicles may include one or more communication transceivers 37 as described above with respect to the vehicle 10.

The vehicle 10 includes one or more actuators 42 in communication with the controller 34. The actuators 42 control one or more vehicle features such as, but not limited to, a fuel injection system, one or more cam phasers, spark plugs, and a camshaft. The vehicle features may further include interior and/or exterior vehicle features such as, but are not limited to, doors, a trunk, and cabin features such as air, music, lighting, etc.

With reference to FIGS. 1 and 2, the system 11 is configured to assess lateral acceleration of the vehicle 10 using infrequent, periodic vehicle telemetry data reports. The vehicle telemetry data includes vehicle and trip identifiers, timestamps, geographical location of the vehicle 10 (e.g., GPS coordinates), heading of the vehicle 10, and the velocity of the vehicle 10 at a specific frequency (e.g., up to every three seconds). The vehicle telemetry data does not include the lateral acceleration of the vehicle 10 or other vehicle measured data that can be used to estimate the lateral acceleration of the vehicle 10. The system 11 curates the telemetry data by using position vectors and headings to detect vehicle turns and estimate an unknown curve radius generating the observed geographical positions (e.g., GPS coordinates) and headings. The velocity of the vehicle 10 is then used to determine the lateral acceleration experienced by the vehicle 10. The lateral acceleration estimates generated by the system 11 may be used in different ways, such as hard cornering event detection, highway curve guidance, drive behavior characterization for insurance risk purposes, drive characterization for teen and fleet monitoring applications, and intersection or interchange assessment that can be used to inform road authorities and road management entities. The system 11 also provides a measurement foundation to locate curves and determine arc centers constraining the steering choices of drives and autonomous vehicles. As discussed above, the system 11 includes the controller 34 with machine-readable instructions as described in the method 100. The system 11 may be modified to detect near-miss or spin-out events based on implausible heading changes with respect to the road curvature and radius. Moreover, the system 11 may be adapted to include weather condition assessment and identify hard cornering events based on modified thresholds that are appropriate for the current detected weather conditions (e.g., rain, snow, etc.)

Figure 3:
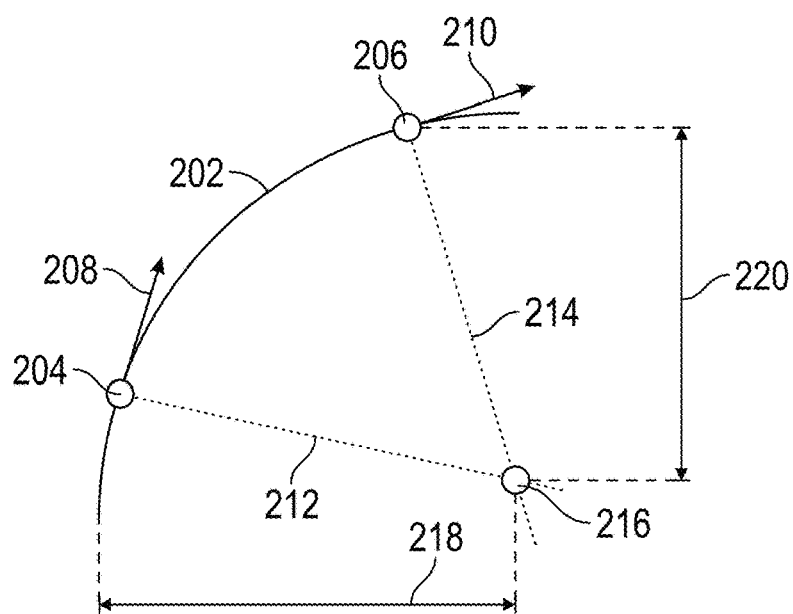
FIG. 3 is a schematic diagram of a curved trajectory of the vehicle.

With reference to FIGS. 2 and 3, the method 100 begins at block 102. The method is cloud hosted and uses connected vehicle telemetry data as input. Block 102 entails receiving the vehicle telemetry data. The vehicle telemetry data is collected by the sensors 40 of the vehicle 10, which is driving along a curved trajectory in a road, intersection, or interchange. As discussed above, the vehicle telemetry data includes, among other things, geographical positions (e.g., GPS coordinates) of the vehicle 10 along the curved trajectory 202. The method 100 may use two consecutives geographical positions of the vehicle 10 along the curved trajectory 202. Specifically, the method 100 may use a first GPS location 204 at a first time and a second GPS location 206 at a second time. The second time may be three seconds later than the first time. The vehicle telemetry data further includes the heading of the vehicle 10 at each geographical position (e.g., the first GPS location 204 and the second GPS location 206). The heading of the vehicle 10 may be represented as heading vectors. Accordingly, the telemetry data includes a first heading vector 208 that is determined at the first time and a second heading vector 210 that is determined at the second time. The first heading vector 208 intersects the curved trajectory 202 at the first GPS location 204. The second heading vector 210 intersects the curved trajectory 202 at the second GPS location 206. The telemetry data further includes the velocity of the vehicle 10 at each geographical position. Therefore, the telemetry data includes the velocity of the vehicle 10 at the first GPS location 204 and the velocity of the vehicle 10 at the second GPS location 206. The method 100 then continues to block 104.

At block 104, the telemetry data is matched with map by road segment. Segments of a road, intersection, or interchange are matched with the geographical positions (e.g., the first GPS location 204 and the second GPS location 206) of the vehicle 10. Then, the method 100 proceeds to block 106.

At block 106, the controller 34 determines whether the telemetry data has been map-matched to all the road segments in the desired area. If the telemetry data has not been map-matched to all the road segments in the desired area, then the method 100 returns to block 102. If the telemetry data has been map-matched to all the road segments in the desired area, then the method 100 proceeds to block 108.

At block 108, the controller 34 processes the trace points. In other words, the controller 34 process the vehicle telemetry data (e.g., the geographical positions, headings, velocities). To do so, the controller 34, for each geographical position, creates a line that is perpendicular to the heading vector and intersects the geographical position of the vehicle 10. Thus, for the first GPS location 204, a first radius line 212 is created. The first radius line 212 is perpendicular to the first heading vector 208 and intersects the first GPS location 204. Additionally, a second radius line 214 is created. The second radius line 214 is perpendicular to the second heading vector 210 and intersects the second GPS location 206. Then, the intersection 216 between the first radius line 212 and the second radius line 214 is determined. Then, the controller 34 determines the distance (e.g., the first distance 218) from the intersection 216 to the first GPS location 204 and the distance (e.g., the second distance 220) from the intersection 216 to the second GPS location 206. Next, the controller 34 selects the minimum of the first distance 218 and the second distance 220 as the curve radius of the curved trajectory of the vehicle 10. In other words, the curve radius is defined as the distance with lowest value between the first distance 218 and the second distance 220. Then, the method 100 continues to block 110.

At block 110, the controller 34 determines the lateral acceleration of the vehicle 10 when traveling along the curved trajectory in the road, intersection, or interchange. To do so, the controller 34 may use the following equation:

$$Lat\ Accel = \frac{v^2}{radius \times g} \qquad \text{Eq. 1}$$

where:
Lat Accel is the lateral acceleration of the vehicle 10;
v is the vehicle velocity;
radius is the curve radius; and
g is the gravitational constant.

The lateral acceleration is determined for each geographical position (e.g., the first GPS location 204 and the second GPS location 206) and for each observed velocity. Then, the lateral acceleration is then converted to g-force. For example, if the lateral acceleration is in meters per second squared, the lateral acceleration may be divided by 9.8 to obtain the g-force. Next, the method 100 proceeds to block 112.

At block 112, the controller 34 develops or updates a table of curve radius values at different g-forces at various speeds. To do so, the controller 34 compares the previously determined g-forces a predetermined threshold (e.g., 0.6 g) to determine whether the g-force is greater than the predetermined threshold. Block 112 may also entail generating a notification related to the previously determined g-force in response to determining that the g-force is greater than the predetermined threshold. For example, the vehicle controller 34 may command the user interface 23 of the vehicle 10 to display a message indicating a cornering event. Further, a web application may provide the notification. The web application enables road management entities to identify hard cornering locations to assess road risk levels. Also, the web application may serve as a traffic management dashboard, fleet manager, parental smartphone app or similar app. At block 112, the notification related to the previously determined g-force may be transmitted to the remote system 48 for highway curve guidance, drive behavior characterization for insurance risk purposes, drive characterization for teen and fleet monitoring applications, and for intersection or interchange assessment that may be used to inform vehicle occupants.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for determining lateral acceleration, comprising:
   receiving vehicle telemetry data, wherein the vehicle telemetry data is collected by sensors of a vehicle traveling along a curve trajectory, the vehicle telemetry data includes a plurality of geographical positions along the curved trajectory traveled by the vehicle, the vehicle telemetry data includes a heading of the vehicle at each of the plurality of geographical positions along the curved trajectory traveled by the vehicle, and the vehicle telemetry data includes a velocity of the vehicle at each of the plurality of geographical positions;
   determining a curve radius of the curve trajectory traveled by the vehicle using the vehicle telemetry data, wherein the plurality of geographical positions includes a first GPS location of the vehicle at a first time and a second GPS location of the vehicle at a second time, the second time is a predetermined time period later than the first time, the heading is a first heading of the vehicle at the first GPS location, the vehicle telemetry data includes a second heading of the vehicle at the second GPS location, the first heading is defined by a first heading vector, and the second heading is defined by a second heading vector, and wherein determining the curve radius comprises:
   creating a first radius line that intersects the first GPS location and is perpendicular to the first heading vector;

creating a second radius line that intersects the second GPS location and is perpendicular to the second heading vector;

determining an intersection point where the first radius line intersects the second radius line;

determining a first distance from the intersection point to the first GPS location;

determining a second distance from the intersection point to the second GPS location;

defining the curve radius as a minimum between the first distance and the second distance;

determining a lateral acceleration of the vehicle at each of the plurality of geographical positions along the curve trajectory traveled by the vehicle using the curve radius; and converting the lateral acceleration of the vehicle at each of the plurality of geographical positions along the curve trajectory traveled by the vehicle into a g-force.

2. The method of claim 1, wherein the vehicle telemetry data does not include the lateral acceleration of the vehicle, and the method further includes transmitting a notification related to the g-force.

3. The method of claim 2, further comprising:

comparing the g-force with a predetermined threshold to determine whether the g-force is greater than the predetermined threshold; and in response to determining that the g-force is greater than the predetermined threshold, transmitting the notification related to the g-force; and wherein transmitting notification related to the g-force includes commanding a web application to display a message indicating a hard cornering event.

4. The method of claim 1, determining the lateral acceleration of the vehicle comprises calculating the lateral acceleration of the vehicle using a following equation:

$$Lat\ Accel = \frac{v^2}{radius \times g}$$

where:

Lat Accel is the lateral acceleration of the vehicle;

v Is vehicle velocity;

radius is the curve radius; and g is the gravitational constant.

5. A tangible, non-transitory, machine-readable medium, comprising machine-readable instructions, that when executed by a processor, cause the processor to:

receive vehicle telemetry data, wherein the vehicle telemetry data is collected by sensors of a vehicle traveling along a curve trajectory, the vehicle telemetry data includes a plurality of geographical positions along the curved trajectory traveled by the vehicle, the vehicle telemetry data includes a heading of the vehicle at each of the plurality of geographical positions along the curved trajectory traveled by the vehicle, and the vehicle telemetry data includes a velocity of the vehicle at each of the plurality of geographical positions;

determine a curve radius of the curve trajectory traveled by the vehicle using the vehicle telemetry data, wherein the plurality of geographical positions includes a first GPS location of the vehicle at a first time and a second GPS location of the vehicle at a second time, the second time is a predetermined time period later than the first time, the heading is a first heading of the vehicle at the first GPS location, the vehicle telemetry data includes a second heading of the vehicle at the second GPS location, the first heading is defined by a first heading vector, and the second heading is defined by a second heading vector, and wherein determining the curve radius comprises:

creating a first radius line that intersects the first GPS location and is perpendicular to the first heading vector;

creating a second radius line that intersects the second GPS location and is perpendicular to the second heading vector;

determining an intersection point where the first radius line intersects the second radius line;

determining a first distance from the intersection point to the first GPS location;

determining a second distance from the intersection point to the second GPS location;

defining the curve radius as a minimum between the first distance and the second distance;

determine a lateral acceleration of the vehicle at each of the plurality of geographical positions along the curve trajectory traveled by the vehicle using the curve radius; and convert the lateral acceleration of the vehicle at each of the plurality of geographical positions along the curve trajectory traveled by the vehicle into a g-force.

6. The tangible, non-transitory, machine-readable medium of claim 5, wherein the vehicle telemetry data does not include the lateral acceleration of the vehicle, and the machine-readable medium further includes machine-readable instructions, that when executed by a processor, cause the processor to:

transmit a notification related to the g-force.

7. The non-transitory, machine-readable medium of claim 6, further comprising machine-readable instructions, that when executed by a processor, cause the processor to:

compare the g-force with a predetermined threshold to determine whether the g-force is greater than the predetermined threshold; and in response to determining that the g-force is greater than the predetermined threshold, command a user interface of the vehicle to display a message indicating a hard cornering event.

8. The non-transitory, machine-readable medium of claim 5, wherein the lateral acceleration of the vehicle is determined using a following equation:

$$Lat\ Accel = \frac{v^2}{radius \times g}$$

where:

Lat Accel is the lateral acceleration of the vehicle;

v Is the vehicle velocity;

radius is the curve radius; and g is the gravitational constant.

9. A system, comprising:

a plurality of sensors;

a controller in communication with the plurality of sensors, wherein the controller programmed to:

receive vehicle telemetry data, wherein the vehicle telemetry data is collected by sensors of a vehicle traveling along a curve trajectory, the vehicle telemetry data includes a plurality of geographical positions along the curved trajectory traveled by the vehicle, the vehicle telemetry data includes a heading of the vehicle at each of the plurality of geographical positions along the curved trajectory traveled by the vehicle, and the vehicle telemetry data includes a velocity of the vehicle at each of the plurality of geographical positions;

determine a curve radius of the curve trajectory traveled by the vehicle using the vehicle telemetry data, wherein the plurality of geographical positions includes a first GPS location of the vehicle at a first time and a second GPS location of the vehicle at a second time, the second time is a predetermined time period later than the first time, the heading is a first heading of the vehicle at the first GPS location, the vehicle telemetry data includes a second heading of the vehicle at the second GPS location, the first heading is defined by a first heading vector, and the second heading is defined by a second heading vector, and wherein determining the curve radius comprises:

creating a first radius line that intersects the first GPS location and is perpendicular to the first heading vector;

creating a second radius line that intersects the second GPS location and is perpendicular to the second heading vector;

determining an intersection point where the first radius line intersects the second radius line;

determining a first distance from the intersection point to the first GPS location;

determining a second distance from the intersection point to the second GPS location;

defining the curve radius as a minimum between the first distance and the second distance;

determine a lateral acceleration of the vehicle at each of the plurality of geographical positions along the curve trajectory traveled by the vehicle using the curve radius; and convert the lateral acceleration of the vehicle at each of the plurality of geographical positions along the curve trajectory traveled by the vehicle into a g-force.

10. The system of claim 9, wherein the vehicle telemetry data does not include the lateral acceleration of the vehicle, and the controller is programmed to transmit a notification related to the g-force.

11. The system of claim 10, wherein the controller is programmed to:

compare the g-force with a predetermined threshold to determine whether the g-force is greater than the predetermined threshold; and in response to determining that the g-force is greater than the predetermined threshold, command a user interface of the vehicle to display a message indicating a hard cornering event.

12. The system of claim 9, wherein the lateral acceleration of the vehicle is determined using a following equation:

$$Lat\ Accel = \frac{v^2}{radius \times g}$$

where:

Lat Accel is the lateral acceleration of the vehicle;

v is the vehicle velocity;

radius is the curve radius; and g is the gravitational constant.

* * * * *